Patented Jan. 9, 1940

2,186,003

UNITED STATES PATENT OFFICE 2,186,003

COLOR STABILIZATION OF GREEN VEGETABLES

James S. Blair, Maywood, Ill., assignor to American Can Company, New York, N. Y., a corporation of New Jersey No Drawing. Application March 3, 1937, Serial No. 128,858

6 Claims. (Cl. 99—186)

The present invention relates to a method of stabilizing the natural green color of canned green vegetables, such as peas, spinach, asparagus and the like, and has particular reference to the use of one or more reagents of moderate basic strength and of limited solubility in water, these reagents being conveniently added to the brine with which the product is associated in the canning process.

The hydrolytic and oxidative changes which accompany the sterilization or processing of vegetables in commercial canning generally cause a notable increase in the acidity of the product, as has been pointed out, for example, in Bulletin No. 17-L issued in January, 1921 by the Research Laboratory of the National Canners Association. As a more specific illustration of such changes as directed to the processing of peas and to their increase of acidity in canning it may be said that the normal pH value for the fluids expressed from fresh raw peas is ordinarily about 6.5 or 6.6 but may be in special cases as high as 6.9. The canned product resulting from the processing of peas will be found to have a pH value ranging from 5.8 to 6.4 and most frequently from 6.1 to 6.2. This decrease in pH constitutes an increase in acidity which has much to do with the destruction of the natural green pigment during processing and during subsequent storage.

The present invention is directed to the prevention of such destruction of the natural color without interfering in any way with the usual process and sterilization steps of commercial canning and this is in the nature of a control of the pH of the product being treated, by the use of certain alkaline reagents having suitable properties. These reagents are added to the brine with which the product is canned.

A reagent having suitable properties for the purpose of pH control may be defined as one having the following general characteristics:

1. It will have sufficient basicity to endow the product being treated with a suitable pH value.
2. It will not establish in the product a pH value initially too high; that is, a pH value that is destructive of tissue or texture such as would cause the product to become soft or "mushy".
3. It will supply sufficient alkaline reserve to maintain the proper pH value during processing and storage in spite of the reactions, attendant upon such steps, which normally tend to lower the pH.
4. It will have only limited solubility in water, both at room temperature and at the temperature of processing, thereby establishing during the sterilization step the necessary alkaline reserve while avoiding the presence of soluble buffer salts deleterious to the flavor and texture of the product.
5. It will be non-toxic and preferably closely related to the natural mineral constituents of the food product itself.

Magnesium hydroxide may be named as one specific reagent having the above characteristics. Calcium hydroxide is another. The hydroxides of magnesium and calcium are the natural reagents to use for pH control inasmuch as salts of these elements are among the chief mineral constituents of peas and other green vegetables. It is believed that the use of both magnesium and calcium hydroxides, in conjunction, is desirable for peas and probably for most of the other green vegetables.

It may be mentioned that in adding the reagent to the brine, which is done preferably before the product is brined and preparatory to sealing in a can, there may be substituted for the hydroxides the corresponding oxides.

As an example of one use of the color stabilization process of the present invention, the following steps will be given, it being understood that the term color stabilization is used in a broad sense as including the establishment in the final product of a favorable condition for the retention of the primary color of the pigment:

The peas after being made ready for canning are preferably blanched at the usual temperature of from 180° F. to 190° F. for a suitable length of time, this time element varying somewhat with the character of the peas. The blanched peas may then be cooled in water if desired although the cooling step is often omitted. The peas are then canned in a brine containing suspended magnesium and calcium hydroxides corresponding approximately to 6.50 grams MgO and 3.25 grams CaO per gallon of brine. It is desirable to leave but a small headspace and to give the filled cans an exhaust treatment so as to secure a high closing temperature. Salt and sugar may be used in the brine for flavor as desired.

Modification of the usual water-blanching step may be made by using a mildly alkaline solution for blanching, and this change in procedure minimizes the destruction of color. Peas, for example, when subjected to such a modified blanch and then carried through the process steps described in the preceding paragraph will be greener than if they had received only the regular water blanch. Such a mildly alkaline solution for blanching may be obtained by dissolving sodium bicarbonate (NaHCO₃) in water or by suspending magnesium hydroxide (Mg(OH)₂) or calcium hydroxide (Ca(OH)₂), or a mixture of both hydroxides, in water. The exact amount and nature of these mildly alkaline reagents is not of critical importance as to the color of the peas and may vary over a wide range.

It has been found that satisfactory color retention may be obtained, in the color stabilization process of the present invention, by the use of smaller quantities of the alkaline reagent in the brine if the blanched vegetables are subsequently subjected to a soaking. A three hour soaking in plain water at room temperature, for example, will so condition peas that a suspension of hydroxides corresponding to 3.25 grams MgO and 1.62 grams CaO per gallon of brine will give, after processing and storage, a degree of color retention approximating that obtained in unsoaked peas with double the amount of reagents. This soaking step where the same amount of reagents is used will give a greener hue in the final product and the appearance of the brine is also improved.

Under some conditions in the practice of the above described steps, the addition of magnesium and calcium hydroxides as reagents will carry the total magnesium and calcium content somewhat above the natural range. This may be undesirable. In such cases the difficulty may be avoided by a preliminary treatment in the nature of a "base-exchange" reaction.

The compounds of magnesium and calcium which are present as natural constituents of peas and other green vegetables are only very slightly soluble in water so that their magnesium and calcium content cannot be significantly reduced by extraction with water. However, the magnesium and calcium content of the vegetable may be greatly reduced by soaking in an aqueous solution of a soluble salt such as sodium chloride. This ordinarily is carried out by a room temperature soak after blanching.

This soluble salt solution soak, like the soaking in water already described, may also be for three hours or thereabouts. This brings about the base-exchange referred to and is primarily of importance as a step in preparing the vegetable for the subsequent action of the reagents in the brine. In other words the base-exchange reaction by itself has no effect on increasing the green color of the final product.

The magnesium and calcium content of peas may be readily reduced in this manner to such an extent that its quantitative replenishment by magnesium and calcium, added to the brine as the hydroxides, gives sufficient pH control to attain the results described above.

Thus the use of the base-exchange reaction in treating peas, for example, together with the fundamental color stabilization set forth above, yields a final canned product in which the pH is higher than the customary pH of canned peas, but in which the magnesium and calcium content is only slightly, if at all, higher than that of a product packed by the customary procedure. Therefore it will be seen that any undesirable effect of having in the product a total magnesium and calcium content above that which is natural to peas, is avoided.

It has been found that the soaking in a solution of a soluble salt which brings about the base-exchange reaction, is like the soaking in plain water above referred to in that it also so conditions the peas, for example, that less of magnesium and calcium hydroxides need be used in the subsequent process to effect a given degree of color retention. In fact, the benefits conferred by the pre-conditioning soak are even slightly greater when the salt solution, rather than plain water, is used as the soaking medium.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of stabilizing the natural green color of vegetables during canning and storage which comprises, blanching the vegetable product in water which has been made mildly alkaline by the addition of sodium bicarbonate at about 180° F. to 190° F., cooling the blanched vegetables in water which has been made mildly alkaline by the addition of lesser amounts of sodium bicarbonate than that used in blanching, soaking the blanched and cooled vegetables in a water bath containing sodium chloride at room temperature for approximately three hours to render the product more susceptible to the establishment of an alkaline reserve, adding to water a mixture of magnesium and calcium hydroxides to provide a brine, incorporating the treated brine with the blanched product, hermetically sealing the same, and processing the sealed product by heat.

2. The method of stabilizing the natural green color of vegetables during canning and storage which comprises blanching at a temperature of about 180° to 190° F. the vegetable product in water which has been made mildly alkaline by the addition of sodium bicarbonate, cooling the same to room temperature, soaking the blanched and cooled vegetables in a water bath containing sodium chloride at room temperature for approximately three hours to effect a base exchange thereby reducing the natural magnesium and calcium content of the product, adding to water magnesium and calcium hydroxides to provide a brine, hermetically sealing together the brine and product, and processing the sealed product by heat whereby the green color of the product is not lost even over a storage period while at the same time the total magnesium and calcium content is not unduly increased.

3. The method of stabilizing the natural green color of vegetables during canning and storage which comprises suspending calcium hydroxide in water and blanching the vegetable product therein at about 180° F to 190° F. to provide an alkaline reserve, adding magnesium hydroxide to a brine to maintain the alkaline reserve, incorporating the treated brine with the blanched product, hermetically sealing the same in containers, and then processing the sealed product by heat whereby the green color of the product is retained over a storage period.

4. The method of stabilizing the natural green color of vegetables during canning and storage which comprises suspending calcium hydroxide in water and blanching the vegetable product therein at about 180° F. to 190° F. to provide an alkaline reserve, adding calcium hydroxide to a brine to maintain the alkaline reserve, incorporating the treated brine with the blanched product, hermetically sealing the same in containers, and then processing the sealed product by heat whereby the green color of the product is retained over a storage period.

5. The method of stabilizing the natural green color of vegetables during canning and storage which comprises suspending calcium hydroxide in water and blanching the vegetable product therein at about 180° F. to 190° F. to provide an alkaline reserve, adding magnesium and calcium hydroxides to a brine to maintain the alkaline reserve, incorporating the treated brine with the blanched product, hermetically sealing the same in containers, and then processing the sealed product by heat whereby the green color of the product is retained over a storage period.

6. The method of stabilizing the natural green color of vegetables during canning and storage which comprises, the independent steps of blanching and soaking the vegetables, hermetically sealing the product so treated in containers with a salt-sugar brine containing magnesium and calcium hydroxides, and finally processing the sealed product by heat, the said blanching step being carried out in an alkaline water bath at a temperature of about 180° F. to 190° F., and the said soaking step being carried out in a bath containing a sodium salt and rendering the product more susceptible to the establishment of an alkaline reserve.

JAMES S. BLAIR.